Nov. 25, 1969  G. L. GAULKE  3,480,100
STEERING AXLE
Filed Jan. 4, 1967  2 Sheets-Sheet 1
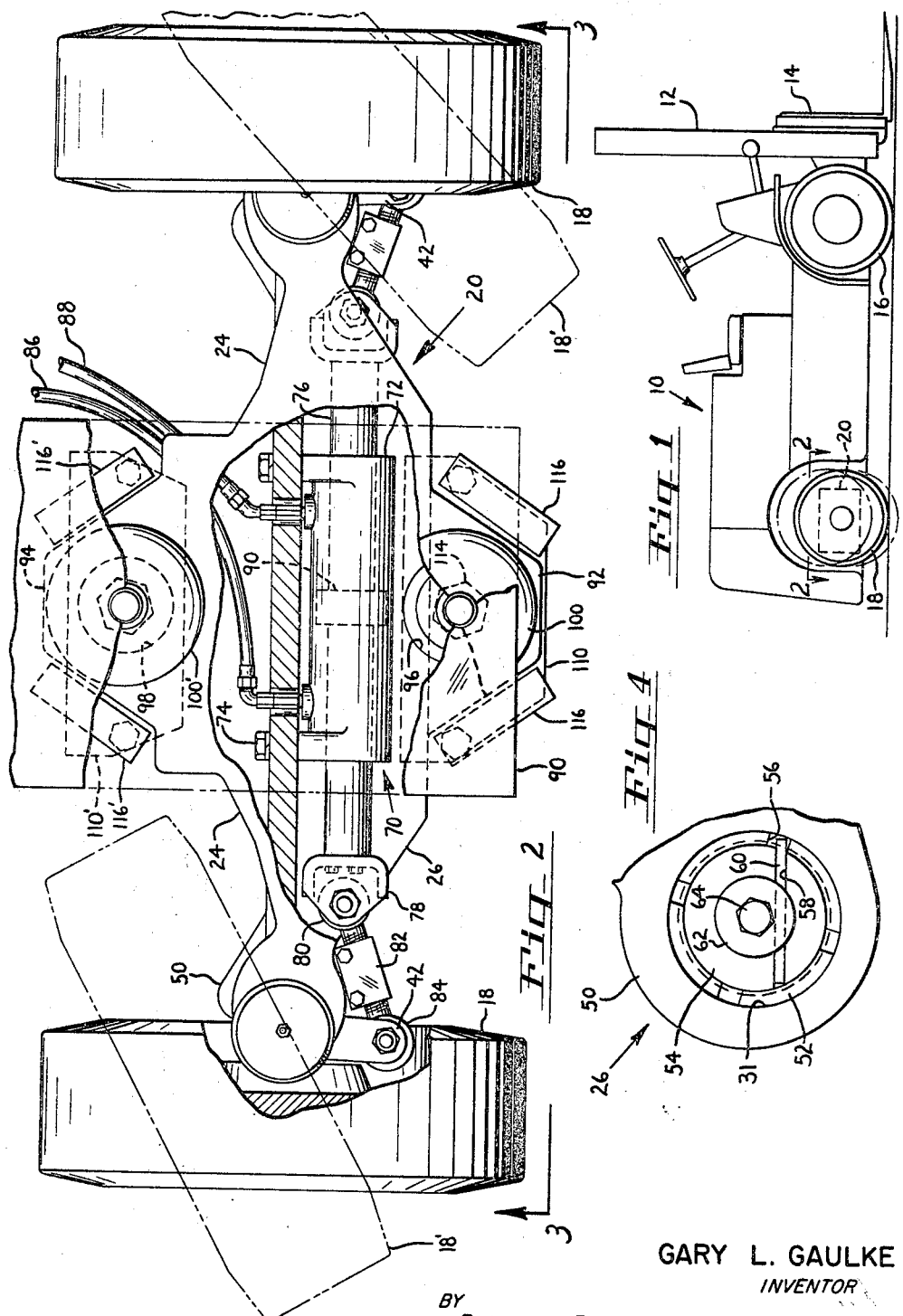
GARY L. GAULKE
INVENTOR
BY
BUCKHORN, BLORE, KLARQUIST & SPARKMAN
ATTORNEYS Nov. 25, 1969  G. L. GAULKE  3,480,100
STEERING AXLE
Filed Jan. 4, 1967  2 Sheets-Sheet 2
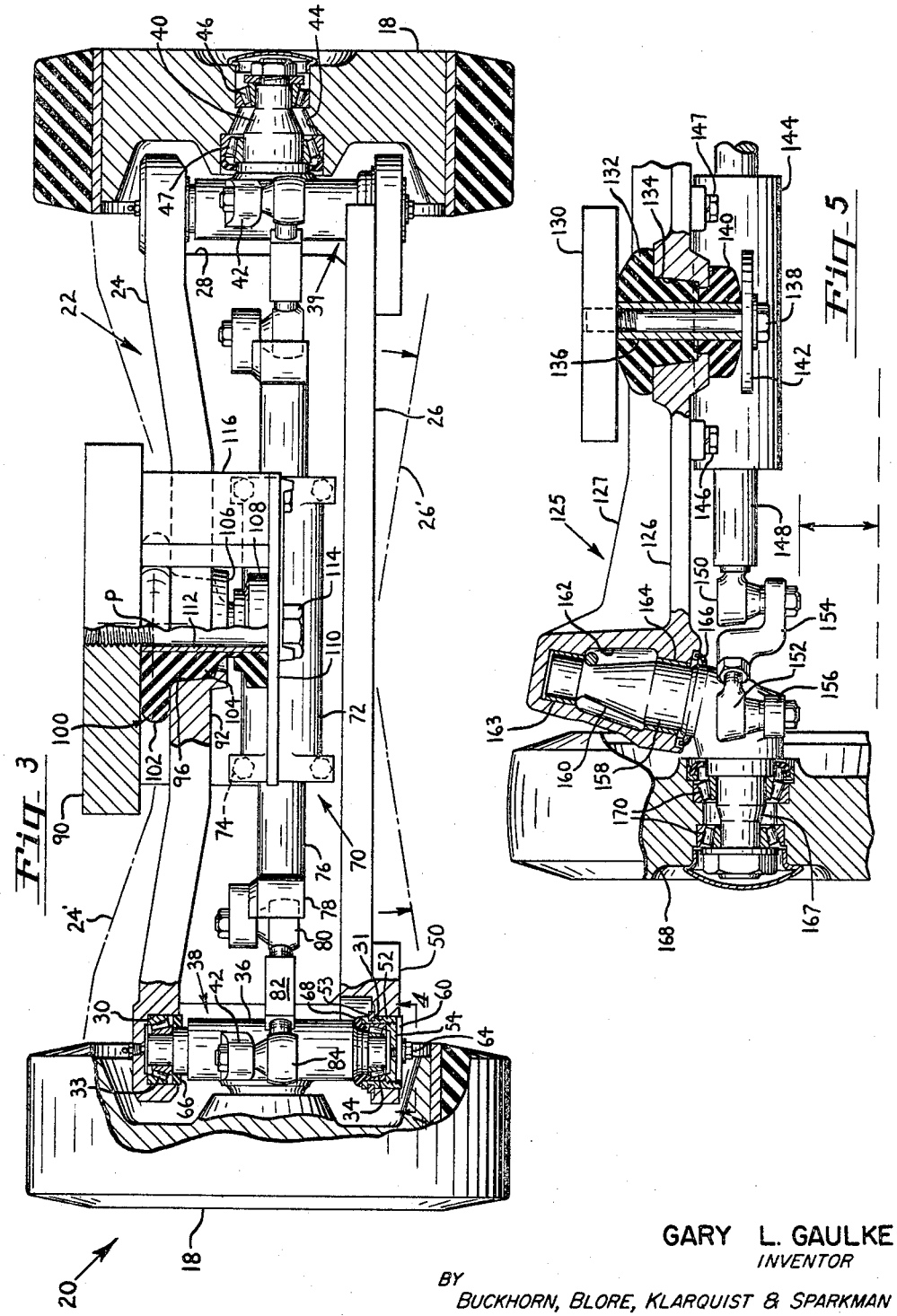
GARY L. GAULKE
INVENTOR
BY
BUCKHORN, BLORE, KLARQUIST & SPARKMAN
ATTORNEYS

United States Patent Office 3,480,100
Patented Nov. 25, 1969

3,480,100
STEERING AXLE
Gary L. Gaulke, Gresham, Oreg., assignor to Hyster Company, Portland, Oreg., a corporation of Nevada
Filed Jan. 4, 1967, Ser. No. 607,250
Int. Cl. B62d 5/00; B60g 11/22; B62b 1/00
U.S. Cl. 180—79.2      3 Claims

ABSTRACT OF THE DISCLOSURE

The steering axle of the invention is suspended beneath the frame of an industrial truck and mounts a steering prime mover in the form of a two-way hydraulic fluid-actuated steering cylinder. In one embodiment the axle includes an upper, horizontally disposed axle frame portion spaced above a lower similar axle frame portion, with the two portions rigidly joined together by a vertically extending web portion. The opposite ends of the upper and lower axle frame portions define spindle housings which receive spindle bearings and pivotally mount a pair of wheel spindles. Each spindle is of one-piece construction so as to eliminate the need for a king pin and includes a spindle arm which mounts a wheel, and a steering arm. The steering cylinder is stationarily mounted in a horizontal transverse position on the web portion of the axle. The single piston rod of the cylinder projects from both ends thereof toward the opposed steering arms and is connected to each arm by a short tie link. Thus, such rod functions both as a tie rod and drag link to turn both wheels when actuated in either direction.

The axle is connected to the frame of the lift truck by a pair of elastomer connectors spaced fore and aft of the rotational axes of the steered wheels along the longitudinal centerline of the truck. In this manner steering forces and road shocks are isolated from the frame, and the axle is permitted to pivot relative to the frame about a longitudinal pivot axis.

A second embodiment incorporates the same features as the first embodiment except that the second has a one piece axle frame which corresponds to the upper axle portion of the first embodiment and which eliminates the lower axle frame portion and the joining web portion of the first embodiment. The two-way steering cylinder is mounted directly to the underside of the axle frame for increased road clearance. The axle frame has a single large spindle housing at each end thereof which pivotally receives most of the upright portion of an inclined, one-piece wheel spindle.

BACKGROUND OF THE INVENTION

Field of the invention

The present invention relates to a steering axle, and more particularly to a steering axle for an industrial lift truck which incorporates a power steering means.

Description of the prior art

Prior steering axles have presented several different problems as set forth in separate paragraphs as follows:

(1) In conventional steering arrangement, steering forces are transmitted to the wheel spindles to turn the wheels by an outside force of a steering cylinder or pitman arm mounted on the main frame and acting through a drag link or bell crank and tie rods, as shown in the case of a bell crank in Dunham United States Patent 2,187,197. These arrangements have the disadvantage, however, that being tied to the frame, any relative movement between the axle and the frame introduces steering errors into the system. Although the bell crank arrangement of the aforementioned Dunham patent provides a better steering geometry in tight turns than the usual drag link and tie rod system, the former is considerably more complex and expensive to manufacture and maintain because of the large number of moving parts that must be kept lubricated and adjusted.

(2) Prior steering arrangements also provide for pivoting movement of the steering axle relative to the main frame about a longitudinal pivot axis through the use of a pivot pin such as that shown in United States Patent 3,086,971. The manufacture and assembly of such pivot connection have always been a prime source of difficulty and expense.

(3) The steering axle of most lift trucks is mounted either with no flexibility between it and the main frame or with flexibility only in a vertical direction, as with the use of leaf springs as shown, for example, in FIG. 1 of the aforementioned Dunham Patent 2,187,197. Thus, at least a certain amount of horizontal road shock, and in many cases vertical shock as well, is transmitted to the main frame and body of the truck, causing rapid driver fatigue and premature radiator failure.

(4) In prior steering axles the wheel spindles have incorporated a separate king pin in the manner shown in, for example, Ulinski United States Patent 2,829,903 (FIG. 7) to pivotally attach the spindle to the main axle member. The manufacture, assembly, sealing against dirt and water, and lubrication of such spindles heretofore has been another major source of difficulty and expense in connection with steering axles.

SUMMARY OF THE INVENTION

The primary object of the present invention is to provide a new and improved steering axle construction which eliminates or materially reduces the aforementioned problems in conjunction with prior steering axles.

More specifically, features of the present invention include:

(1) A simplified steering axle arrangement providing an improved steering geometry through the use of a double-acting steering cylinder mounted on the axle so as to function as a combined steering prime mover, drag link and tie rod;

(2) A steering axle arangement including a two-way power steering cylinder which has a piston rod extending from both ends of the cylinder and which moves the rod through equal distances in each direction for a given fluid displacement in corresponding directions;

(3) A steering axle arrangement which confines all steering forces within the axle itself so that no steering errors are introduced through relative movement between the axle and the vehicle's main frame;

(4) A steering axle arrangement which has fewer moving parts than prior steering axles, thus simplifying and reducing the cost of manufacture, assembly and maintenance;

(5) A simplified elastomeric mounting for the aforesaid steering axle which eliminates the need for costly and difficult to manufacture longitudinal pivot pins and bearings in providing pivotal movement between the axle and the main frame of a vehicle;

(6) An elastomeric mounting as aforesaid which provides universal flexibility between the body and steering axle of a vehicle for absorbing both horizontally and vertically directed road shocks; and (7) A simplified one piece, easily assembled wheel spindle for the aforesaid steering axle which eliminates the need for king pins.

DESCRIPTION OF THE DRAWINGS

The foregoing and other features of the present invention will become more apparent from the following detailed description which proceeds with reference to the accompanying drawings, wherein:

FIG. 1 is a somewhat schematic side elevational view of a lift truck incorporating a steering axle of the present invention;

FIG. 2 is a top plan view, on an enlarged scale, of the steering axle taken approximately along the line 2—2 of FIG. 1, with certain portions broken away for clarity;

FIG. 3 is a rear elevational view of the steering axle on the same scale as FIG. 2 and taken along the line 3—3 of FIG. 2, with portions broken away and sectioned for clarity;

FIG. 4 is an enlarged bottom view of the left-hand wheel spindle mounting of FIG. 3 taken along the line 4—4 of FIG. 3; and FIG. 5 is a fragmentary elevational view of a portion of a modified steering axle in accordance with the invention with parts thereof broken away and sectioned for clarity.

DETAILED DESCRIPTION OF THE PREFERRED EMBODIMENTS

(1) FIG. 1 EMBODIMENT

With reference to the drawings, FIG. 1 illustrates an industrial lift truck having a main body portion 10 with the usual upright mast structure 12 mounted at its front end for raising and lowering a load carriage 14. The body is supported by four wheels including a pair of driven front wheels 16 and a pair of steering rear wheels 18. The steering wheels are carried by a steering axle assembly designated generally at 20.

Referring to FIGS. 2 and 3, the steering axle assembly includes an axle frame member 22 composed of an upper, horizontally disposed axle frame portion 24 and a lower, similarly disposed axle frame portion 26 rigidly joined together by a vertically extending web portion 28. Both ends of the upper and lower axle frame portions define a pair of vertically opposed spindle housings 30, 31, as shown best at the left hand side of FIG. 3. The upper and lower spindle housings at each end of the axle house tapered roller bearings 33, 34 respectively, which pivotally mount opposite ends of the main body 36 of one of a pair of wheel spindles 38, 39.

The wheel spindles are of a unique construction in that they are integral one-piece members which include a spindle arm 40 (right hand side of FIG. 3) and a steering arm 42, both of which project laterally from the spindle body intermediate the opposite ends thereof. The spindle arm of each wheel spindle extends into a wheel hub 44 and rotatably mounts one of the wheels 18 in tapered roller bearings 46, 47.

Assembly of each wheel spindle in its spindle housings is simplified through a special construction of lower spindle housing 31, as shown most clearly at the left hand side of FIG. 3. Spindle housing 31 is defined by an opening through an offset end portion 50 of the lower axle frame portion so as to permit, when bearings 34 are removed, insertion of the opposite ends of the spindle body into their respective housings. With the lower end of spindle body 36 in lower opening 31, a bearing retainer sleeve 52 and bearings 34 are inserted within the opening and about the lower end of the spindle body through the open lower end of such opening. The sleeve is held in place by a snap ring 53. Thereafter the open lower end of housing 31 is closed by a screw cap 54 having external threads which mate with internal threads of retainer sleeve 52.

Referring to FIG. 4, the lower edge of sleeve 52 is provided with a series of circumferentially spaced notches 56, and cap 54 is provided with a non-radial slot 58. Cap 54 is screwed within sleeve 52 until one end of slot 58 registers with one of the notches 56 in the sleeve. At this point a locking pin 60 is inserted into the slot so that one end of the pin overlaps into the aligned notch 56 so as to prevent relative rotation between the cap and sleeve.

A washer 62 is then placed over locking pin 60 to retain the latter in place, and the washer in turn is held in place by a cap screw 64. Of course, the inwardly opening ends of the upper and lower spindle housings are closed by seals 66 and 68 respectively.

The foregoing described spindle assembly is unique not only in its easy assembly, but also in that its one piece construction eliminates conventional king pins altogether.

Steering wheels 18 are turned through a power steering prime mover which, in the illustrated embodiment of FIGS. 2 and 3 takes the form of a two-way hydraulic power steering cylinder 70. The steering cylinder has a casing 72 which is bolted at 74 to the web portion 28 of the axle frame. A single piston rod 76 projects from both ends of the cylinder casing toward the steering arms 42 of the opposed wheel spindles. Each of the opposite ends of piston rod 76 has a yoke portion 78 which is connected by a ball stud 80 to one end of a short tie link 82. The opposite end of the tie link is connected by a second ball stud 84 to steering arm 42 of the adjacent wheel spindle.

Fluid under pressure is supplied to the opposite ends of the steering cylinder casing from a source (not shown) on the body of the lift truck through flexible supply and return hoses 86, 88. Pressure fluid entering one end of cylinder casing 72, through for example, line 86, pushes against an enlarged piston portion 90 of unitary piston rod 76 to force the piston rod toward the right as seen in FIG. 2 so as to displace fluid in the right hand end of the casing through line 88, thereby resulting in turning movement of both steering wheels in a counterclockwise direction as viewed in FIG. 2. Similarly pressure fluid entering the right hand end of the cylinder casing through line 88 would effect turning of the wheels in a clockwise direction. The limits of turning movement of the wheels with such an arrangement are indicated in FIG. 2 by the dashed lines 18'.

An advantage of the steering cylinder arrangement shown is that the same fluid displacement in either direction within the cylinder casing will effect movement of piston rod 76 through equal distances in either direction. Furthermore, the steering cylinder arrangement shown is greatly simplified over prior known steering arrangements in that it has fewer moving parts, and the steering cylinder and rod fulfill the combined functions of the steering prime mover, the drag link and the tie rod of conventional steering arrangements. The arrangement also results in an improved steering geometry as compared to prior arrangements. A further important advantage of the foregoing arrangement is that with the steering cylinder stationarily mounted on the axle member itself, all steering forces are confined within the axle assembly so that any relative movement between the axle and the main body and frame of the lift truck does not introduce steering errors into the steering system. Of course other steering prime movers could be substituted for the steering cylinder for reciprocating the equivalent of rod 76 such as, for example, a gear type drive powered by an electric or hudraulic motor carried by the axle.

Another feature of the steering axle is the unique and simplified connection between it and the main frame of the lift truck. The main frame includes a centrally positioned belly pan portion 90, which extends above the steering axle. The steering axle frame itself is made deliberately massive to fulfill one of its functions as a counterpoise for loads supported by the forks of the lift truck. Upper axle frame portion 24 has considerable breadth longitudinally beneath the frame and includes a rearward extension 92 and a forward extension 94 between the opposite ends of the axle and beneath the belly pan. Referring to FIG. 3, extensions 92, 94 have central openings 96, 98, respectively, therethrough. A pair of elastomer connector members 100, 100' extend between the belly pan and the upper axle frame and into openings 96, 98. With reference to member 100, each elastomer member includes an enlarged head portion 102 of greater diameter than its associated opening 96 extending between belly pan 90 of the upper axle frame 24. The elastomer member also includes a stem portion 104 of reduced diameter which extends into opening 96. An annular boss 106 surrounds opening 96 on the underside of upper axle frame 24 and is spaced above an elastomer rebound member 108 aligned vertically beneath the elastomer connector member 100 on a mounting plate 110. Mounting plate 110 is spaced below lower frame portion 90 a predetermined fixed distance by a spacer sleeve 112. The spacer sleeve extends through central openings in the elastomer rebound member 108 and connector member 100 and surrounds a connector bolt 114 which fastens the plate to the belly pan. A pair of guide blocks 116 extend between the belly pan and mounting plate and are connected to each to provide a rigid connection of the plate to the pan. The blocks are spaced slightly from the adjacent edge of upper axle portion 24 and thus serve to limit the amount of horizontal float of the axle. Forward extension portion 94 of the upper axle frame is connected to the belly pan in exactly the same manner as just described with respect to the rear extension, that is, utilizing the other elastomer connector member 100', another rebound member (not shown), a mounting plate 110' and blocks 116'.

From FIG. 2 it is apparent that the two elastomer connector members 100, 100' are positioned on opposite sides of the normal rotational axes of the steering wheels 18 when the wheels are directed straight ahead, and along the centerline of the vehicle. This arrangement permits the axle to pivot about a longitudinal axis P at the centerline of the vehicle while at the same time providing maximum stability of the axle for resisting twisting movement about vertical and transverse axes. The limits of pivoting movement of the axle member relative to the frame are represented by the phantom lines 24' and 26' of FIG. 3.

Another important feature of the elastomer connector members is that they mount the axle so that it floats in all directions relative to the main frame. In this regard, the elastomer connectors permit relative movement between the axle and the frame in both a horizontal direction and a vertical direction so that all road shocks are absorbed by the elastomer connectors 100 rather than being transmitted to the main frame. This feature not only reduces driver fatigue, but also increases radiator life in vehicles, such as most lift trucks, having the radiator mounted above the steering axle.

Connector member 100 is shown in FIG. 3 in its loaded position. When unloaded, it will assume a shape similar to that of the elastomer connector member of the alternative embodiment of FIG. 5.

The function of elastomer rebound member 108 is to limit downward movement of the upper frame member 24 toward mounting plate 110 upon rebounding movement of the upper frame portion away from the belly pan after connector member 100 has absorbed road shock. During such rebounding movement of the axle, the upper portion of rebound member 108 of reduced thickness can move into the lower end of opening 96 in the upper axle frame.

(2) FIG. 5 EMBODIMENT

FIG. 5 illustrates another steering axle embodiment in accordance with the invention. The primary differences between the axle of this embodiment and the axle of the FIG. 3 embodiment is that in the FIG. 5 embodiment the lower axle frame portion and intermediate web portions are eliminated and a slightly different spindle and spindle mounting is utilized.

The steering axle assembly in FIG. 5 includes a one-piece axle member 125 including a broad horizontally extending flange portion 126 and a vertical web portion 127 extending upwardly from the flange portion. The axle is mounted to the belly pan 130 of the lift truck in a manner similar to that described with respects to the FIG. 3 embodiment. That is, a pair of elastomer connector members 132 extend through central openings 134 of the axle flange 126 and between the belly pan 130 and the upper surface of the axle member, and a spacer sleeve 136 and connector bolt 138 maintain the elastomer member 132 and a rebound member 140 in position between a mounting plate 142 and the belly pan 130.

Because in the FIG. 5 embodiment the lower axle frame portion is eliminated, the two-way hydraulic steering cylinder 144 is bolted at 146, 147 directly to the underside of axle flange 126. The single piston rod 148 extending from both ends of the cylinder casing are connected by ball studs 150, 152 to a short tie link 154 and to the steering arm 156 of a wheel spindle 158. The construction of the opposite side of the axle assembly is identical to the left hand side shown in FIG. 5.

Although wheel spindle 158 is of one piece construction like wheel spindles 38 and 39 of the FIG. 3 embodiment, its shape and assembly are somewhat different. An upwardly and inwardly inclined body portion 160 of wheel spindle 158 extends into a spindle housing 162 defined by the adjacent end of the axle member. Within the housing the spindle body is pivotally mounted in bearings 163 and 164. A single seal member 166 at the downwardly opening end of housing 162 seals the housing from dirt and moisture. A spindle arm 167 extends laterally from the lower end of the spindle body and rotatably mounts a steering wheel 168 on tapered roller bearings 170. The pivot axes of the spindles, although laterally inclined, lie in a vertical transverse plane as compared with conventional pivots which lie in an inclined transverse plane. The advantage of my arrangement is that it provides a castering effect when the lift truck is traveling in either forward or reverse, whereas the conventional inclined pivot provides a castering effect in a forward direction only.

The axle embodiment of FIG. 5 does not provide the strength and massiveness of the embodiment of FIG. 3 which is so often desirable in lift truck steering axles. However, the embodiment of FIG. 5 does have several advantages over that of FIG. 3, including (1) simplified spindle assembly, (2) a simplified one-piece spindle structure of generally L-shape as compared to the generally T-shaped spindle of FIG. 3, (3) increased road clearance, (4) an inclined spindle pivot axis for steering improvement, and (5) a lighter weight and less costly axle member.

Having illustrated and described two preferred embodiments of the invention, it should be apparent to those skilled in the art that the invention permits of modification in arrangement and detail.

I claim:
1. In a ground-engaging vehicle having a wheel-supported main frame,
a steering axle assembly including a pair of steered wheels comprising:
an axle member,
a pair of spindle members for rotatably supporting the steered wheels of said vehicle pivotally mounted one on each of the opposite ends of said axle member,
a steering arm extending from each spindle member,
link means interconnecting the steering arms of said pair of spindle members, including a rigid member mounted for reciprocation between said steering arms,
and a motor means stationarily mounted on said axle member for reciprocating said rigid member whereby said rigid member functions both as a tie link and as a drag link,
said axle member including an upper axle portion extending transversely beneath said frame at a level above the rotational axes of the steered wheels,
a pair of longitudinally spaced apart elastomer means extending between said upper axle portion and a bottom portion of said frame, means connecting said elastomer means to said upper axle portion and said frame so as to permit pivotal movement of said axle member relative to said frame about a pivot axis extending longitudinally of said frame and between the upper axle portion and the bottom of said frame above the level of the rotational axes of said wheels, each of the opposite ends of said upper axle portion including a downwardly opening spindle housing for receiving an upper body portion of one of said spindle members and including bearing means for enhancing pivotal movement of said body portion within said housing about a generally upright axis, each of said spindle members including a laterally extending spindle arm portion and a steering arm portion projecting from said body portion, said spindle members including said body portion, spindle arm portion and steering arm portion being of unitary, one-piece, integral construction, whereby the need for a kingpin for interconnecting the spindle member and the axle member is eliminated.

2. In a ground-engaging vehicle having a wheel-supported longitudinally extending main frame,
a steering axle assembly for supporting and steering a transversely opposed pair of steered wheels at the opposite ends of said axle assembly, said assembly comprising:
an axle member extending transversely beneath said frame and terminating at its opposite ends beyond the longitudinal center plane of said frame,
steering means for turning said steered wheels,
a pair of horizontally spaced apart elastomer means extending between said axle member and said frame,
said pair of horizontally spaced apart elastomer means including means connecting said elastomer means to said axle member and said frame in a manner so as to provide pivotal movement between said axle member and said frame about a longitudinal pivot axis lying in the longitudinal center plane of said frame and in a manner so as to provide limited pivotal movement of said axle member about a vertical pivot axis whereby road shocks transmitted to said axle member are absorbed by said elastomer means,
said steering means being carried by said axle member and isolated from said frame in a manner so that steering forces generated by said steering means are confined wholly within said axle assembly and resisted primarily by said axle member itself, whereby pivotal movement of the axle member relative to said frame does not introduce steering errors at the steered wheels.

3. In a ground-engaging vehicle having a wheel supported main frame,
a steering axle assembly including a pair of steered wheels comprising:
an axle member,
a pair of spindle members for rotatably supporting said steered wheels pivotally mounted one on each of the opposite ends of said axle member,
a steering arm extending from each spindle member,
link means interconnecting the steering arms of said pair of spindle members, including a rigid member mounted for reciprocation between said steering arms,
each of the opposite ends of said axle member including a downwardly opening spindle housing for receiving an upper body portion of one of said spindle members,
bearing means within each spindle housing for enhancing pivotal movement of said body portion within said housing about a generally upright axis,
each of said spindle members including a spindle arm portion and said steering arm projecting from said body portion,
said spindle members, including said body portion, spindle arm and steering arm portion being of unitary, one-piece, integral construction, whereby the need for a kingpin for interconnecting the spindle member and the axle member is eliminated.

References Cited
UNITED STATES PATENTS

| | | | |
|---|---|---|---|
| 859,235 | 7/1907 | Macfarren. | |
| 1,846,651 | 2/1932 | Orelind | 280—103 |
| 2,178,073 | 10/1939 | Hardy | 180—79.2 X |
| 2,835,507 | 5/1958 | Davies | 280—112 |
| 1,144,278 | 6/1915 | Allen. | |
| 1,146,008 | 7/1915 | Marmon. | |
| 1,364,872 | 1/1921 | Feightner. | |
| 2,039,912 | 5/1936 | Leighton | 280—96.1 X |
| 2,152,021 | 3/1939 | Baumer | 180—79.2 |
| 2,187,197 | 1/1940 | Dunham | 280—95 |
| 2,582,455 | 1/1952 | Potter | 280—96.1 X |
| 2,829,903 | 4/1958 | Ulinski | 280—95 |
| 2,962,279 | 11/1960 | Wroby | 267—63 |
| 2,978,050 | 4/1961 | Risk et al. | 267—63 X |
| 3,201,143 | 8/1965 | Drong | 280—112 |

KENNETH H. BETTS, Primary Examiner

U.S. Cl. X.R.

267—63; 280—95, 96.1